Nov. 22, 1966   K. R. BRAGG   3,287,034
COUPLING FOR TUBES
Filed May 3, 1962   2 Sheets-Sheet 1

INVENTOR.
KENNETH R. BRAGG
BY
Oberlin, Maky & Donnelly
ATTORNEYS

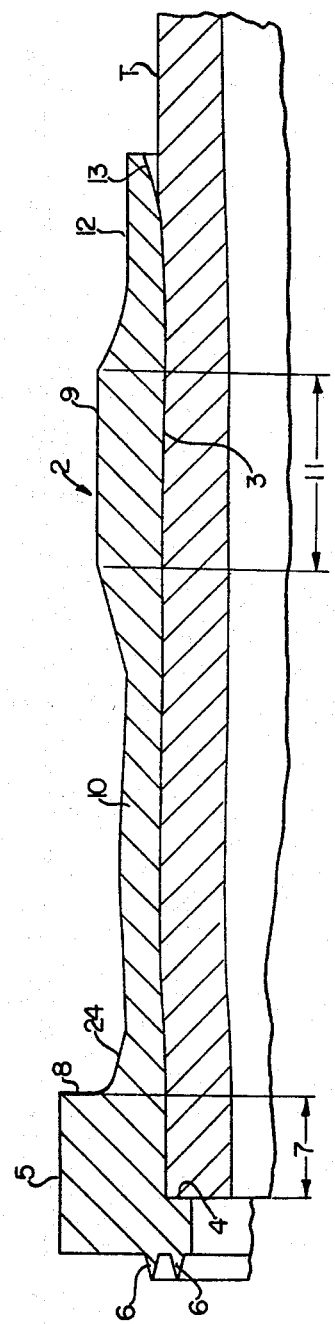
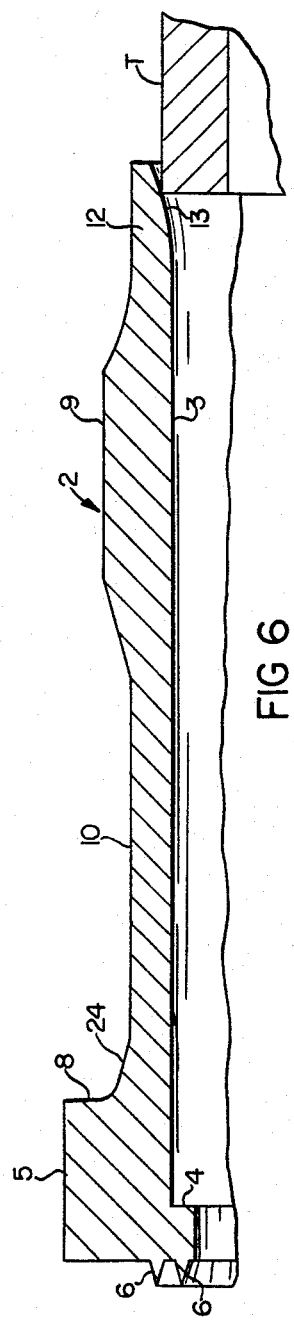

United States Patent Office 3,287,034
Patented Nov. 22, 1966

3,287,034
COUPLING FOR TUBES
Kenneth R. Bragg, Manhattan Beach, Calif., assignor to Parker-Hannifin Corporation, Cleveland, Ohio, a corporation of Ohio
Filed May 3, 1962, Ser. No. 192,137
10 Claims. (Cl. 285—115)

The present invention relates generally as indicated to a coupling for tubes and more particularly to a coupling suitable for use in the fluid control circuits of missiles and space vehicles.

For missile and space vehicle applications, it is imperative that the tube couplings thereof be absolutely fluid-tight for all fluids and environmental conditions. Such tube couplings must also be capable of withstanding vibration and thermal and mechanical shock. It has been proposed heretofore to employ couplings in which the tubes are brazed to the coupling members and in which the coupling members, in turn, are clamped together by screw threaded means to form a fluid-tight joint at their mating seats. Although perfect brazed joints have the necessary strength and fluid sealing characteristics for missile and space vehicle application, they are rather difficult to achieve since the parts must be absolutely clean, the volume of the brazing ring must be selected within close limits to conform with the space which it is to occupy when melted, the brazing temperatures must be closely regulated to secure proper flow of the brazing alloy, and the heating must be localized to avoid heating of previously heat treated areas of the coupling parts. Aside from the foregoing, final inspection for reliability of the brazed joints is difficult.

With the foregoing in mind, it is a principal object of the present invention to provide a tube coupling which fulfills the strict needs in missile and space vehicle application, while avoiding the need of employing brazing or like operations.

It is another object of this invention to provide a tube coupling in which a coupling member and tube are frictionally locked together to provide a strong and fluid-tight joint to withstand vibration and thermal and mechanical shock.

It is another object of this invention to provide a swaged tube coupling assembly in which the swaged member clamps and locks the coupling members together in fluid-tight relation and in which spring back of the swaged member does not relax the clamping pressure exerted thereby on the coupling members.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIGS. 6 and 7 are enlarged cross-section views of the coupling sleeve prior to and after insertion of the tube therein.

Figure 1:
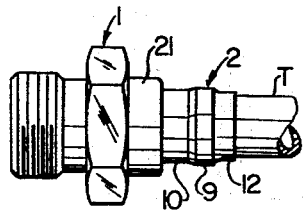
FIG. 1 is a side elevation view of a tube coupling in accordance with the present invention.
Figure 4:
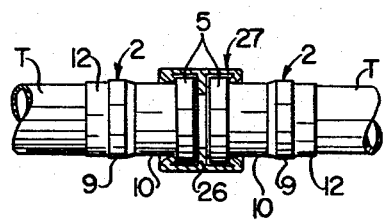
FIG. 4 is a side elevation view, partly in cross-section, showing an integral type swaged connector for joining together a pair of tubes.
Figure 5:
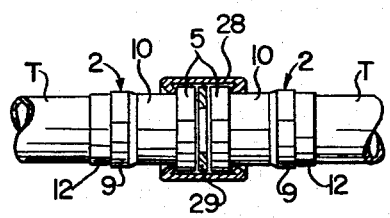
FIG. 5 is similar to FIG. 4, except showing a sleeve-type swaged connector having a washer insert between the tubes.

Referring now in detail to the drawings, each tube T whether coupled to a body 1, as in FIG. 1, or to another tube T as in FIGS. 4 and 5, has a combination press-fit and shrink-fit in the sleeve member 2.

The tube T and the sleeve 2 are frictionally locked together with a combination press-fit and shrink-fit by heating the sleeve 2 to cause thermal expansion thereof on softening to a semi plastic state and forcing thereinto the relatively cooler tube T which is of larger outside diameter than the thermally expanded diameter of the bore 3 of the sleeve. By way of specific example, when the sleeve 2 and tube T are made of corrosion-resisting steel, the bore 3 of the sleeve will preferably be gold plated, the thickness of the plating being from about .0005 to .001″. For use with a tube of ½″ outside diameter, i.e., .500″ to .505″ O.D., the diameter of the bore 3 with its gold plating will preferably be from about .485″ to .490″. Thus, when the sleeve 2 is heated to a temperature of 1700° F., for example, it will expand in diameter but yet the bore 3 will be less than the outside diameter of the tube T. However, the gold plating and the heating of the sleeve will facilitate insertion of the tube T until its end abuts the stop shoulder 4. It has been found that the gold plating in the bore 3 acts not only as a lubricant to decrease the force required to jam the tube T into the heated sleeve 2 and to avoid galling of the tube, but also as a caulking compound to provide a completed "zero-leak" joint between the tube T and the sleeve 2. While the gold interface is preferred, other metals such as silver, copper, or similar metals, may be employed as a combination lubricating and sealing agent.

When the heated sleeve 2 cools to the same temperature as the inserted tube T, it does not contract to its original diameter but remains in a stretched condition with the accompanying hoop or tensile stress therein causing it to tightly grip the tube.

The sleeve is formed with a relatively thick head 5 surrounding stop shoulder 4 and with concentric and annular sealing ribs 6 at one end thereof. One side of head 5 provides a holding shoulder 8.

Spaced from enlarged head 5 is a relatively thick portion 9. Between head 5 and thick portion 9 is a thinner tubular section 10 and on the opposite side of thick portion 9 there is a relatively thin outer end portion 12 having a radiused and outwardly flaring mouth 13.

To assemble the tube to the sleeve 2, the sleeve is first heated to approximately 1700°, except that during heating the sleeve head 5 is retained in chill blocks to avoid heating so that it remains relatively cool. This protects bore 3 in region 7 under thick head 5 against damage from the effects of heating so as to retain a good sealing surface thereon. It is preferable to heat treat the sleeve, at least in the vicinity of head 5, prior to assembly with the tube. Maintaining the head 5 relatively cool during assembly, that is, in the vicinity of 700° F. or less, retains the desired mechanical properties obtained by the previously applied heat treatment. Heating of the sleeve to about 1700° brings it close to its elastic state in which the resistance to expansion under applied stress decreases rapidly.

With the sleeve heated as described, bore 3 will be expanded in diameter but will still be somewhat less in diameter than the tube T. Also, the portion of bore 3 in region 7 will be smaller in diameter than the remaining portion of bore 3 due to the lesser or absence of heating and expansion of head 5.

The tube is now rapidly driven into the sleeve with the forward end portion abutting shoulder 4 to make a tight and efficient seal in the region 7. Flare mouth 13 facilitates entry of the tube and provides a gradually decreasing grip on the tube from within the sleeve toward its outer end to provide efficient vibration dampening support for the tube. The gradual decreasing thickness of the outer end portion 12 of the sleeve due to flare mouth 13 also contributes to the gradually decreasing support for the tube.

On cooling of the sleeve to normal temperatures it tends to contract to its original diameter. Such contraction is resisted by the tube with which it is in intimate engagement. The resistance to contraction provided by the tube causes the hoop or tensile stresses within the sleeve to increase as it cools so as to contract the tube somewhat. Thick portion 9 will decrease in diameter to very nearly its original size and contract the tube down accordingly in region 11. Head 5, which had been expanded very little due to the lesser heating of the same, resumes substantially its original diameter with a very tight grip being imposed upon the tube in the region 7.

Portions 10 and 12 of the sleeve, being thinner than portion 9, are not able to apply as much force on the tube as the sleeve cools and hence contract the tube less than thick portion 9. Thus portion 10 becomes outwardly bowed between thick portions 5 and 9 and portion 12 becomes slightly outwardly flared from thick portion 9 to its end. Bore 3 and tube T assume a similar contour, tube T being slightly cone shaped between region 11 and the midpoint of portion 10 with the smaller diameter of such cone shape being at region 11. This cone shaping provides an additional clamping effect for retaining the tube within the sleeve and also increases the holding effect by the fact that the larger diameter portion of the tube under portion 10 would be required to neck down or contract in order to pass through region 11 of bore 3.

The slight outward flaring of end portion 12 of the sleeve further contributes to the gradually decreasing support of the tube for resisting fatigue failure of the tube under vibration.

As the sleeve cools it also contracts in an axial direction. Since the tube is cool when assembled to the sleeve and is driven into place so rapidly that it never reaches the temperature of the sleeve, the frictional grip upon the tube as the sleeve shrinks axially causes the inner end of the tube to be forced more tightly against shoulder 4 to establish tighter sealing contact therewith. The assumption during cooling of the cone shaping results in additional inward clamping or driving force upon the tube by the axial contraction of the sleeve.

Figure 8:
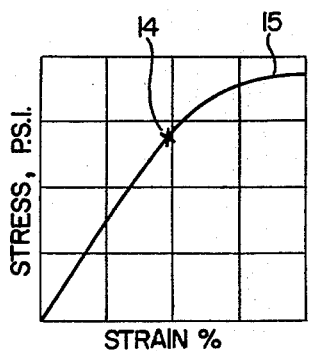
FIG. 8 is a typical stress-strain diagram for the stainless alloy tube and coupling parts employed herein for missile and space vehicle use.

A feature of the invention is that upon cooling of the sleeve the hoop or tensile stress within thickened portion 9 is near the elastic limit for the material, that is, in the vicinity of point 14 on the stress-strain curve shown in FIG. 8, whereas the stress at the axial midpoint of thin portion 10 of the sleeve may be at or somewhat beyond the elastic limit, as indicated by point 15 of the stress-strain curve. This assures a maximum gripping force upon the tube with a sleeve of relatively light weight, it being obvious that if overall weight and bulk is disregarded the sleeve could be made thicker and thus impose greater total grip upon the tube with less unit hoop stress.

By way of illustrative example, the length of the interference fit between the tube T and the sleeve 2 is preferably about one and one-half times the outside diameter of the tube, that is, about ¾" for ½" O.D. tube. For that size tube having a wall thickness of about .050", the radial thickness of the head 5 between the bore and the outside diameter of the head should be about .075" to .085", the radial thickness of the sleeve portion 10 should be from about .025" to .035", the radial thickness of the sleeve portion 9 should be from about .045" to .055", and the radial thickness of the sleeve portion 12 should progressively decrease to about .015" to .025", for a length of about 5/32". The portion 9 is also of about 5/32" axial length (zone 11) and then tapers at an angle of about 15° to the portion 10 of about 15/32" length between zones 7 and 11. The length of zone 7 should be 5/64". A tube T thus mechanically, frictionally locked in the sleeve 2 will appear as illustrated in the much enlarged FIG. 7.

Referring in detail to FIGS. 6 and 7, the heating of sleeve 2 to say 1700° F. except at head 5 causes expension of the sleeve so that its bore 3 is several thousandths of an inch larger than at room temperature. Such thermal expansion substantially decreases the interference with the tube T and, moreover, at such elevated temperature the sleeve 2 yields more readily than at room temperature. Accordingly, with the assistance of the gold-plated bore 3, the tube T may be inserted into the sleeve with considerably less force than would be required if the sleeve 2 without a plated bore 3 were in unheated condition. In zone 7 the tube T is a heavy force fit inside the thick head 5 whereby the tube end will be contracted almost the entire amount of the interference between the tube O.D. and the bore 3.

Now, when the sleeve 2 cools from 1700° F. to room temperature it shrinks onto the tube T to increase the tensile stresses therein in the portions 10, 9, and 12 and to contract the tube T by about one-half the interference at zone 11, a varying much smaller amount between zones 7 and 11 owing to the thinness of portion 10, and progressively to zero tube contraction axially outward from zone 11 owing to the shape and thinness of portion 12. The sleeve 2 as herein dimensioned with reference to the inserted tube T assures that the tensile stresses in the sleeve 2 are at or close to the proportional limit 14 of the stress-strain curve 15 shown in FIG. 8 thereby enhancing fatigue life and shock resistance of the sleeve-tube joint.

It has been found that the joint between the tube T and the sleeve 2 is absolutely fluid-tight, is so strong that the tube T will burst at 16,000 p.s.i., for example, without leakage and without evidence of any tube pullout. This joint also has superior vibration resistance owing to the spaced firm gripping regions 7 and 11 and the gradually relaxing grip from the outer firm gripping zone 11 to the end of the sleeve 2.

For use in the missile and space vehicle field the coupling parts, that is, the body 1, the sleeve 2, and the tube T, are made of corrosion-resisting material of which there is a wide selection including numerous newly developed alloys which have excellent corrosion-resistance, high strength at high temperatures, etc. While Martensitic and Ferritic stainless steels may be employed, it is preferred to employ Austenitic stainless steels which contain sufficient chromium and nickel to make the steel Austenitic and non-magnetic, the carbon content being relatively small.

A typical stress-strain diagram is shown in FIG. 8 herein, and it is desired to maintain the stress in the sleeve 2 due to the press and shrink fits at approximately the yield point or proportional elastic limit 14. This, as aforesaid, is the result achieved, for example, with the sleeve 2 herein for ½" O.D. tube T. The same relative proportions obtain with reference to sleeves 2 for tubes of O.D. larger or smaller than ½".

Having thus assembled the sleeve 2 and tube T, as aforesaid, by a combination press fit and shrink fit to achieve a maximum gripping strength without over-stressing the sleeve 2, the next step is to assemble the sleeve-tube unit to the body 1 in such manner as to make and retain a fluid-tight mechanical seal. For that purpose, the body 1 is provided with a plane annular seat 20 in which the sharp crest sealing rib 6 of small included angle of about 30° are adapted to be embedded in fluid-tight relation when the end of sleeve 2 is axially forced against seat 20. For locking of the sleeve 2 in the body 1, the latter is formed with a frusto-conical lip 21 which has, at its large end, an inturned frusto-conical lip 22. Thus, when the lip 21 is deformed, as by swaging, from its frusto-conical form in FIG. 2, to the cylindrical form of FIG. 3, the rounded inner edge 23 of the inturned lip 22 will engage the shoulder 8 of the sleeve head 5 and also the beveled face 24 intersecting such shoulder, whereby to deform the lip 22, as shown in FIG. 3. As evident, when the lip 21 is deformed as aforesaid, the end 23 of the inturned lip 22 will firmly press the sleeve 2 axially toward the seat 20 whereby the sealing ribs 6 will become embedded in the body seat 20. At the same time, such deformation of the inturned lip 22, as in FIG. 3, maintains the axial sealing force on the sleeve 2 despite springback of the lips 21 and 22 after release of the swaging or deforming forces. In fact, spring back of the curled end of lip 22 exerts pressure axially on shoulder 8 and radially on beveled face 24 of sleeve 2.

As a matter of further information, the slant height of the lip 21 for a ½" O.D. tube coupling is about .22" at an apex angle of about 50° and the dimension 25 is about .141 to .146" when used with a sleeve head 5 of nearly the same length from the crest of the ribs 6 to the shoulder 8. The lip 21 is about .050" thickness, while the other lip 22 is of less thickness, for example, .040", and the initial inside diameter of the rounded inner edge 23 of the lip 22 is of approximately the same diameter as the outside diameter of the sleeve head 5 except for tolerance to assure easy entrance of the sleeve head 5 within the lips 21 and 22 with the crests of the sealing ribs 6 contacting the body seat 20.

Since, in the final assembly of the FIG. 1 coupling the outer surface of lip 21 thereof is cylindrical, it is possible to use a tool similar to a conventional tube cutter for transversely severing the lip 21 at a line axially outward of seat 20, whereby the coupling assembly may be taken apart without destroying the sleeve-tube connection. To reassemble the coupling, a new body 1 is used and its frusto-conical lips 21 and 22 are deformed as by swaging, from the FIG. 2 to the FIG. 3 condition.

Figure 2:
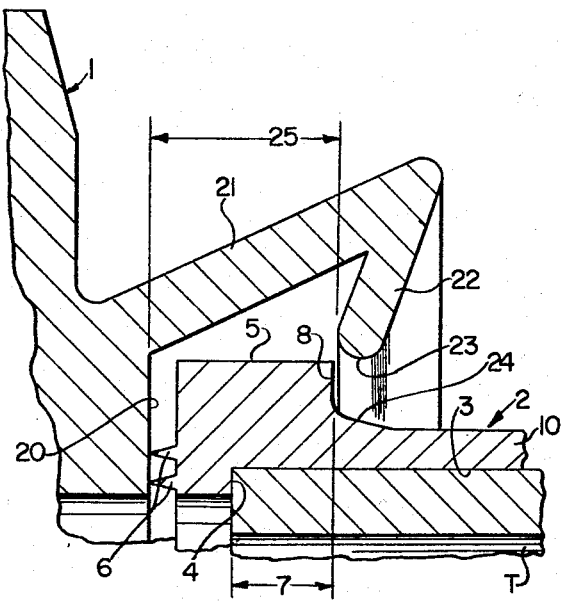
FIG. 2 is a much enlarged radial fragmentary cross-section view showing the coupling parts prior to swaging together thereof.
Figure 3:
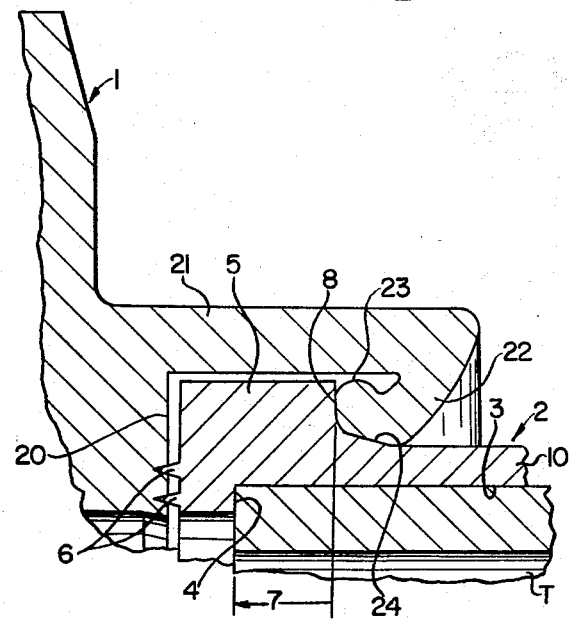
FIG. 3 is an enlarged cross-section view similar to FIG. 2, except showing the completed tube coupling assembly.

In lieu of assembling the sleeve-tube unit to a body member 1, as in FIG. 1, a pair of opposed tubes T each with a sleeve 2 having a combination press fit and shrink fit thereon, may be positioned with their sealing ribs 6 engaging the opposite sides of a web 26 in an integral-type swage connector body 27 as shown in FIG. 4 in which both ends of body 27 are fashioned in the manner shown in FIG. 2, and swaged, or otherwise deformed, to cylindrical form as shown, thus causing the lips thereof to be deformed to maintain sealing contact of the seal ribs 6 with the seats on opposite sides of web 26 despite spring back of the swaged end portions.

With reference to FIG. 5, the coupling assembly herein shown is substantially the same as shown in FIG. 4 except that instead of an integral web 26 in the double ended swage connector 28, there is provided a separate washer 29 which has seats on opposite sides for the sealing ribs 6 of the respective sleeves 2.

Other modes of applying the principle of the invention may be employed, change being made as regards the details described, provided the features stated in any of the following claims, or the equivalent of such, be employed.

I therefore particularly point out and distinctly claim as my invention:

1. In combination, an annular tube coupling sleeve having a bore therein and a tube within said bore, said annular sleeve having a pair of axially spaced relatively thick portions and a relatively thin portion between said thick portions, said sleeve having a combination press-fit and shrink-fit about said tube throughout said thin portion and at least one of said thick portions and a press-fit at said other thick portion, said bore being of a smaller diameter at said thick portions than at said thin portion, said thin portion and said tube being radially outwardly bowed between said thick portions.

2. The combination of claim 1 further comprising a body having an annular recess therein including a seat, and an integral inturned lip axially spaced from said seat, wherein one of said relatively thick portions is adjacent one end of said sleeve and is clamped between said seat and lip to establish a fluid-tight joint between said body and sleeve, said last-mentioned one thick portion having a radially extending shoulder facing said inturned lip, said inturned lip having a curled end means in engagement with said radially extending shoulder continuously forcing the same toward said seat.

3. The combination of claim 1 wherein said bore is of smaller diameter at one of said thick portions than at the other thick portion in the assembled position.

4. The combination of claim 1 wherein said sleeve has another relatively thin portion outwardly of one of said thick portions, and said bore at said another thin portion is of gradually increasing diameter from said one thick portion to the outer end of said bore.

5. The combination of claim 1 wherein said tube coupling sleeve, prior to the insertion of said tube in the bore thereof, has a uniform bore diameter.

6. The combination of claim 5 wherein said thin portion and said one thick portion are heat expanded prior to inserting said tube in said bore, said other thick portion remaining relatively cool, whereby the diameter of said bore at said other thick portion prior to insertion of said tube is smaller than the diameter of the remaining portions of said bore.

7. The combination of claim 6 wherein the outside diameter of said tube is slightly greater than the diameter of said bore when said sleeve is heated as aforesaid.

8. The combination of claim 7 wherein a stop shoulder projects from said sleeve into said bore adjacent the axially outer end of said other thick portion for engagement by the adjacent end of said tube when inserted in said bore as aforesaid, and said sleeve continuously forces said tube into sealing contact with said stop shoulder due to axial shrinkage of said sleeve upon cooling.

9. The combination of claim 1 wherein the bore of said sleeve is gold plated to seal scratches and like imperfections on the exterior of said tube and to serve as a lubricant to facilitate assembly of said tube in said sleeve.

10. The combination of claim 1 wherein the tensile stress within said one thick portion is slightly less than the elastic limit of the material of said sleeve, and the tensile stress at the axial mid-point of said thin portion is slightly greater than such elastic limit.

References Cited by the Examiner
UNITED STATES PATENTS

| 311,299 | 1/1885 | Elliott | 285—382 |
| 779,896 | 1/1905 | Wood | 285—381 |
| 966,513 | 8/1910 | Avery | 285—382 X |
| 1,004,270 | 9/1911 | Jahnke | 285—381 |

(Other references on following page)

UNITED STATES PATENTS

| | | | |
|---|---|---|---|
| 1,170,927 | 2/1916 | Moore | 285—382 X |
| 1,814,267 | 7/1931 | Swartz | 29—447 X |
| 1,938,995 | 12/1933 | Beynon. | |
| 1,957,397 | 5/1934 | Stitt | 29—511 X |
| 2,224,145 | 12/1940 | Dugan et al. | 29—447 |
| 2,251,718 | 8/1941 | Parker | 285—115 X |
| 2,363,586 | 11/1944 | Guarnashelli | 285—382 X |
| 2,438,107 | 3/1948 | Rabbitt | 285—416 X |
| 2,574,625 | 11/1951 | Coss | 285—382 |
| 2,585,237 | 2/1952 | Gay | 29—447 |
| 2,647,847 | 8/1953 | Black | 29—447 |
| 3,114,566 | 12/1963 | Coberly | 285—381 X |

FOREIGN PATENTS

| | | |
|---|---|---|
| 24,446 | 6/1906 | Austria. |
| 372,153 | 3/1923 | Germany. |
| 225,486 | 12/1924 | Great Britain. |
| 259,891 | 10/1926 | Great Britain. |

CARL W. TOMLIN, *Primary Examiner.*

THOMAS F. CALLAGHAN, *Examiner.*